United States Patent [19]

Kummer

[11] Patent Number: 4,667,799
[45] Date of Patent: May 26, 1987

[54] SHIM CAP DEVICE FOR CLUTCH LEVER ADJUSTMENT

[75] Inventor: Martin E. Kummer, Auburn, Ind.

[73] Assignee: Dana Corporation, Toledo, Ohio

[21] Appl. No.: 739,411

[22] Filed: May 30, 1985

[51] Int. Cl.$^4$ .................... F16D 13/70; F16D 13/75
[52] U.S. Cl. .................. 192/70.25; 192/70.3;
192/99 A; 192/110 R; 192/111 R
[58] Field of Search ............ 192/70.25, 99 A, 110 R, 192/70.29, 70.3, 111 R; 74/526; 188/196 V, 201

[56] References Cited

U.S. PATENT DOCUMENTS

| | | | |
|---|---|---|---|
| 1,981,504 | 11/1934 | Goodwin | 192/110 R |
| 2,366,594 | 1/1945 | Carlson | 192/70.25 X |
| 2,579,179 | 12/1951 | Edens | 192/89 B |
| 2,613,778 | 10/1952 | Carlson | 192/99 A X |
| 2,630,897 | 3/1953 | Porter | 192/110 R X |
| 3,352,393 | 11/1967 | Thelander | 192/70.3 |
| 4,332,314 | 6/1982 | Flotow | 192/99 A X |

Primary Examiner—Rodney H. Bonck
Assistant Examiner—David A. Testardi
Attorney, Agent, or Firm—Frank B. McDonald

[57] ABSTRACT

A shim cap device provides an apparatus for achieving clutch lever adjustment. In a preferred form, a plurality of shim caps are each selected for an appropriate thickness of a shim portion thereon. Each selected cap is interposed between one tail end of the several clutch release levers and a pressure plate boss normally directly engageable by that particular tail end. Each shim portion has a selective thickness for the purpose of establishing an initial adjustment of each associated clutch release lever. In a preferred form, the shim portion of each cap is disposed for planar contact with the radial surface of its associated boss, and is integral with a wall portion disposed orthogonally to the shim portion. The wall portion extends about the perimeter of the shim portion for press fit engagement of the sides of the associated boss. In one preferred form, the wall portion defines sides which extend continuously about the perimeter of the shim portion, and the sides are flared at an angle with respect to the shim portion greater than 90°. In another preferred form, the wall portion is discontinuous about the perimeter of the shim portion.

10 Claims, 7 Drawing Figures

SHIM CAP DEVICE FOR CLUTCH LEVER ADJUSTMENT

BACKGROUND OF THE INVENTION

This invention relates to clutch lever adjustment in clutches of the type actuated by a plurality of pivotally mounted release levers. More particularly, the invention relates to devices attached to bosses on the rear surfaces of pressure plates and engageable with the release levers.

The numerous devices available in the prior art for achieving satisfactory clutch lever adjustment include members having shanks disposed within the bosses, discs or plates situated in recesses contained in such bosses, and rivets at the nose ends of such release levers. Most of the devices utilized, however, are quite cumbersome to install, and/or are difficult to adjust once situated in position on either the pressure plate boss or on the lever per se. Some of such devices are subject to considerable pressure plate drive lug wear, and others tend to become dislodged from their intended positions within the useful life period of the associated clutch system.

Due to manufacturing tolerances, rarely will a single dimension adjustment work from lever to lever within a given clutch system. As a result, some of the prior art adjustment devices are not suitable for providing variable thickness corrections at the various lever locations within the clutch.

SUMMARY OF THE INVENTION

The invention disclosed herein provides a device for clutch lever adjustment which insures variable adjustments as may be required from lever to lever within a given clutch system. Moreover, the device of the present invention insures against drive lug wear during the useful clutch life.

In a preferred form, the device of the present invention is defined by a plurality of variable thickness shim caps which are mounted over the lever engaging bosses of a pressure plate. Each cap defines a shim portion disposed for planar contact with the radial surface of one of the bosses. Each cap also defines a wall portion disposed orthogonally to the shim portion and integral therewith, the wall portion extending about the perimeter of the shim portion. In a preferred form, the wall portion is disposed for press fit engagement of the sides of an associated boss. Each shim portion is of a selected thickness, chosen for establishing an initial adjustment of each clutch release lever position.

Finally, in a preferred form, the wall portion defines the plurality of sides, each of which is flared at an angle greater than 90° with respect to the shim portion to facilitate installation of the shim cap over a boss.

DETAILED DESCRIPTION OF THE PREFERRED EMBODIMENTS

Figure 1:
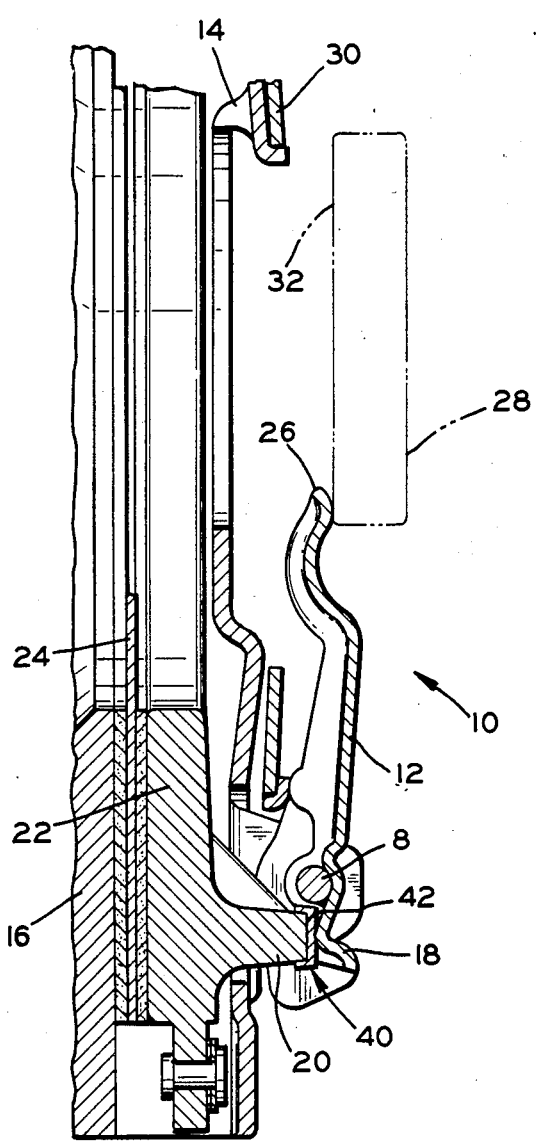
FIG. 1 is a fragmentary view of a friction clutch which incorporates a preferred embodiment of the shim cap device of the present invention.

Referring initially to FIG. 1, a fragmentary view of a friction clutch 10 of the type incorporated in moving vehicles includes a plurality of clutch release levers 12, only one of which is shown. The release levers 12 are pivotally secured by pins 8 to a clutch cover 14. The cover 14 is, in turn, secured by fasteners (not shown) to a flywheel 16 which rotates with an engine crankshaft (also not shown).

The outward extremities or tail portions 18 on the levers 12 are adapted for engagement of bosses 20 which protrude axially from the rear surface of a pressure plate 22. Those skilled in the art will appreciate that the pressure plate 22 is utilized to frictionally secure a driven disc 24 against the flywheel 16. In fact, FIG. 1 depicts the "engaged" position of the friction clutch 10 by which an engine crankshaft may be directly coupled with the driving axles of a vehicle. The engaged position is released by the interaction between inner nose ends 26 of the levers 12 and an operator actuated release bearing 28, wherein the force asserted against the inner nose ends by the release bearing (leftwardly, as shown) is sufficient to overcome the normal clutch engagement force provided in the present case by a Belleville spring 30.

Figure 2:
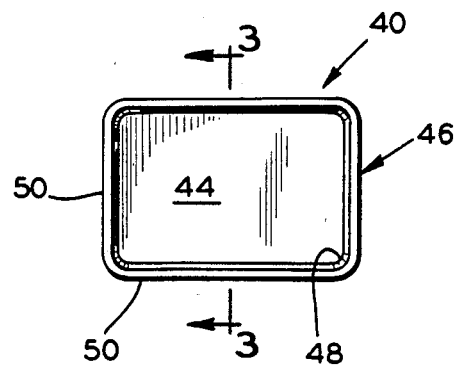
FIG. 2 is a plan view of the embodiment of the shim cap device of FIG. 1.
Figure 3:
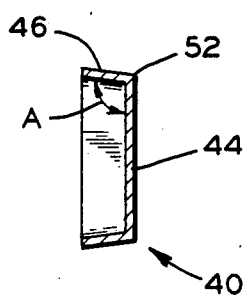
FIG. 3 is a sectional view of the same embodiment of the shim cap device taken along lines 3—3 of FIG. 2.

The present invention provides a plurality of shim cap devices 40, each interposed between a radial surface 42 of each boss 20 and a corresponding tail portion 18 of a lever 12. Referring to FIGS. 2 and 3, each shim cap device 40 as shown in FIG. 1 includes a shim portion 44 designed for planar contact with the surface 42 and which in the invention presented herewith is selected from a plurality of such caps containing varying thicknesses of the shim portions. Hence, during manufacture of the clutch, upon installation of the pins 8 and levers 12, for each boss-lever interface, a shim cap 40 will be selected from a plurality of shim portions 44 having a range of thicknesses chosen approximately to cause all of the inner nose ends 26 to lie in a common plane. The intended result is that the nose ends 26 bear uniformly against the annular surface 32 of the release bearing 28.

In the friction clutch 10 of the type represented in FIG. 1, the typical pressure plate diameter will fall within a range of eight (8) to sixteen (16) inches. For this size range, the presently preferred shim portion thicknesses are five thousandths of an inch apart. Thus nine (9) distinct choices of shim portion thicknesses are employed which range from thirty-five (35) thousandths to seventy five (75) thousandths, with tolerances of plus or minus one (1) thousandth. The presently preferred embodiment incorporates color coding as a means of visually identifying the various thicknesses of the portions 44, although other alternative systems of identification may be utilized, as for example a numerical identification code.

Each shim cap contains a wall portion 46 which is oriented orthogonally with respect to the shim portion and integral therewith. Each wall portion 46 extends about the perimeter 52 of the shim portion 44, and is disposed for being press fit onto the boss 20 on which it is secured. For this purpose, referring specifically to FIG. 3, the wall portion 46 is preferably slightly flared, and hence makes an angle "A" greater than 90° with respect to the shim portion 44 to facilitate insertion of the cap 40 over the boss 20 during manufacture of the clutch.

It will be noted that in the preferred embodiment of FIGS. 1, 2, and 3, the wall portion 44 defines a plurality of linear sides 50 which are integrally connected with each other by arcuate continuous joints 48. This particular embodiment is convenient to manufacture, and may be fabricated in a single-step stamping operation.

Figure 4:
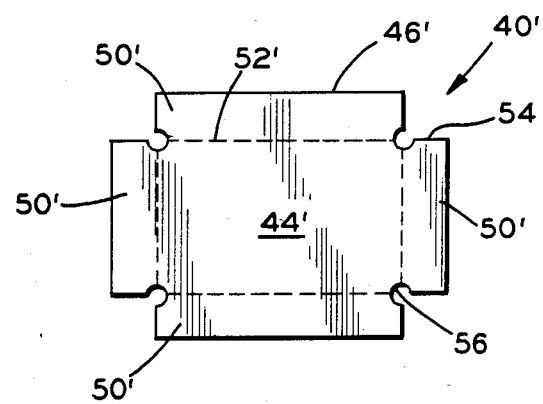
FIG. 4 is another preferred embodiment of the shim cap device of the present invention shown in plan view during a stage of its fabrication.

An alternate embodiment of the shim cap device of the present invention is shown as 40′ in FIG. 4. The cap 40′, shown in an intermediate stage of manufacture, is of the same general configuration as the cap 40 of FIGS. 1-3. However, as the linear sides 50′ of the finished product will be formed by bending along the perimeter line 52′ at approximately 90° to form the orthogonal sides, and cap 40′ will thus have non-continuous, non-integral joints 54, at the interfaces of its sides. In addition, the cap 40′ will preferably include stress relief cut-outs 56 to assure proper stress relief appropriate to the latter fabrication process.

Figure 5:
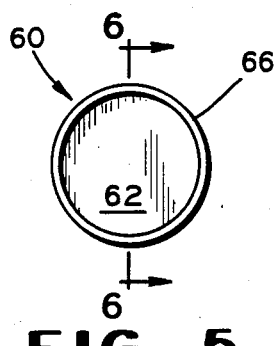
FIG. 5 is a plan view of a still further embodiment of the shim cap device of the present invention.
Figure 6:
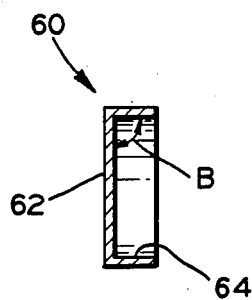
FIG. 6 is a sectional view of the embodiment of FIG. 5, taken along lines 6—6 of FIG. 5.

A still further preferred embodiment of a shim cap device is shown at 60 in FIGS. 5 and 6. The shim cap 60 includes a shim portion 62 and wall portion 64, analagous to portions 44, 44′ and 46, 46′ of the earlier-discussed embodiments. However, the wall portion 64 of the shim cap 60 is of a circular cross section 66 as depicted more clearly in FIG. 5. The shim cap 60 is appropriate for bosses 20 of circular configurations. Referring to FIG. 6, the shim cap 60 contains an angle "B" between shim portion 62 and wall portion 64 approximately equal to 90°. Hence, the wall portion 64 is not flared relative to the shim portion 62 as was the wall portion 46 relative to the shim portion 44 in the embodiment of FIG. 3. The latter is represented here only for manufacturing convenience, to the extent that it may be more difficult to achieve a flared wall in a design of circular configuration than that of rectangular configuration. However, a flared wall 64 is not outside of the scope of the present invention.

Figure 7:
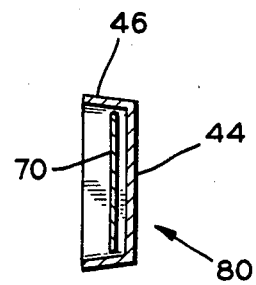
FIG. 7 is a sectional view of yet another embodiment of the shim cap device of the present invention.

Finally referring to FIG. 7, another preferred embodiment of the shim cap device of the present invention is shown at 80. The shim cap 80 essentially utilizes a stamped design similar to the shim cap 40 of FIG. 3. However, a shim plate 70 is utilized to provide for the variable thickness aspect. The cap 80 does not provide for variable thicknesses in its shim portion 44. In the version of FIG. 7, care must be taken to insure that the lateral dimensions of the shim plates 70 are no greater than those of the shim portions 44 to allow the plates 70 to make unobstructed planar contact with the shim portions 44.

Although only several preferred embodiments of the present invention are represented and described herein, numerous other embodiments are envisioned to fall within the spirit and scope of the following claims.

What is claimed is:

1. In a clutch including a plurality of pivotally mounted clutch releases levers for actuation thereof, a pressure plate including a plurality of axially protruding bosses, each boss containing a planar radial surface engageable with one of said levers; and improvement comprising a plurality of shim caps mounted over said bosses, each cap defining a shim portion disposed for planar contact with said radial surface of one boss, each cap further defining a wall portion disposed substantially orthogonally to said shim portion and integral therewith, said portion extending about the perimeter of said shim portion and disposed for press fit engagement of the sides of said boss, said press fit engagement being sufficient to frictionally retain said shim cap on said boss without need for additional securement means, said improvement further comprising a thickness identification code for each shim portion.

2. The clutch of claim 1 wherein said release levers define boss-engaging tail ends, said clutch comprising a plurality of said caps, said shim portion of each of said caps providing a radially extending bearing surface disposed for cooperating with one of said tail ends, each shim portion having a selective thickness for establishing an initial adjustment of each clutch release lever.

3. The clutch of claim 2 wherein said wall portion extends continuously about said perimeter of said shim portion.

4. The clutch of claim 2 wherein said wall portion extends discontinuously about said perimeter of said shim portion.

5. The clutch of claim 2 wherein said wall portion defines a plurality of linear sides.

6. The clutch of claim 2 wherein said wall portion defines a generally circular cross-section.

7. The clutch of claim 5 wherein said sides are flared at an angle with respect to said shim portion greater than 90°.

8. The clutch of claim 1 further comprising a shim plate interposed between said shim portion and said radial surface of said boss.

9. The clutch of claim 8 wherein said release levers define boss-engaging tail ends, said clutch further comprising a plurality of said caps, said shim portion of each of said caps providing a radially extending bearing surface disposed for cooperating with one of said tail ends, each of said shim plates having a selective thickness for establishing an initial adjustment of each clutch release lever.

10. A clutch including a plurality of pivotally mounted clutch release levers for actuation of said clutch, a pressure plate including a plurality of bosses each containing a planar radial surface, a plurality of shim caps, each of said shim caps mounted over one of said bosses and defining a shim portion disposed for planar contact with said radial surface of one of said bosses, each of said caps further defining a wall portion disposed orthogonally to said shim portion and integral therewith, said wall portion extending about the perimeter of said shim portion and disposed for press fit engagement of the sides of said boss, each of said release levers defining shim engaging tail ends, each shim portion of each cap having a selective thickness for establishing an initial adjustment of each associated clutch release lever said press fit engagement being sufficient to frictionally retain said shim caps on said bosses without need for additional securement means.

* * * * *